United States Patent
Cumming et al.

(10) Patent No.: US 6,923,482 B2
(45) Date of Patent: Aug. 2, 2005

(54) MULTIPLE MATERIAL BUMPER BEAM

(75) Inventors: David M. Cumming, Royal Oak, MI (US); Gianfranco Gabbianelli, Troy, MI (US); Jeffery J. Mellis, Bloomfield Hills, MI (US); Hiroshi Uchiyama, Chiba (JP)

(73) Assignee: Magna International Inc., Troy, MI (US)

( * ) Notice: Subject to any disclaimer, the term of this patent is extended or adjusted under 35 U.S.C. 154(b) by 0 days.

(21) Appl. No.: 10/608,730

(22) Filed: Jun. 27, 2003

(65) Prior Publication Data

US 2004/0262930 A1 Dec. 30, 2004

(51) Int. Cl.⁷ .............................................. B60R 19/04
(52) U.S. Cl. ...................................... 293/102; 293/120
(58) Field of Search .......................... 293/102, 120–122

(56) References Cited

U.S. PATENT DOCUMENTS

| | | | |
|---|---|---|---|
| 3,779,592 A | * 12/1973 | Golze et al. | ................. 293/120 |
| 5,092,512 A | 3/1992 | Sturrus et al. | |
| 5,104,026 A | 4/1992 | Sturrus et al. | |
| 5,154,462 A | * 10/1992 | Carpenter | ................... 293/120 |
| 5,305,625 A | 4/1994 | Heinz | |
| 5,306,058 A | 4/1994 | Sturrus et al. | |
| 5,340,177 A | 8/1994 | Maxam | |
| 5,395,036 A | 3/1995 | Sturrus | |
| 5,454,504 A | 10/1995 | Sturrus | |
| 5,545,022 A | 8/1996 | Rosasco | |
| 5,545,361 A | 8/1996 | Rosasco | |
| 5,566,874 A | 10/1996 | Sturrus | |
| 5,725,266 A | 3/1998 | Anderson et al. | |
| 5,799,991 A | * 9/1998 | Glance | ....................... 293/121 |
| 5,813,594 A | * 9/1998 | Sturrus | ....................... 228/146 |
| 5,845,948 A | 12/1998 | Anderson et al. | |
| 6,042,163 A | 3/2000 | Reiffer | |
| 6,174,009 B1 | 1/2001 | McKeon | |
| 6,179,353 B1 | 1/2001 | Heatherington et al. | |
| 6,231,095 B1 | 5/2001 | Chou et al. | |
| 6,240,820 B1 | 6/2001 | Sturrus et al. | |
| 6,282,769 B1 | 9/2001 | Longo et al. | |
| 6,318,775 B1 | 11/2001 | Heatherington et al. | |
| 6,325,431 B1 | * 12/2001 | Ito | ............................. 293/102 |
| 6,349,521 B1 | 2/2002 | McKeon et al. | |
| 6,360,441 B1 | * 3/2002 | Himsl et al. | ............... 29/897.2 |
| 6,406,077 B2 | 6/2002 | Johnson | |
| 6,409,239 B1 | 6/2002 | Tjoelker et al. | |
| 2001/0030432 A1 | 10/2001 | Mansour et al. | |
| 2001/0054827 A1 | 12/2001 | Sundgren et al. | |
| 2002/0021937 A1 | 2/2002 | Ochoa | |
| 2002/0040525 A1 | 4/2002 | Himsl et al. | |
| 2002/0053805 A1 | 5/2002 | Azuchi et al. | |
| 2002/0060462 A1 | 5/2002 | Glance | |

FOREIGN PATENT DOCUMENTS

GB 1497438 * 1/1978 ................. 293/120

* cited by examiner

Primary Examiner—Dennis H. Pedder
(74) Attorney, Agent, or Firm—Honigman Miller Schwartz and Cohn LLP

(57) ABSTRACT

A bumper beam includes a first portion of a first material and a second portion of a second material. The first material has different material properties than the second material. For example, the first material may have a generally higher tensile or yield strength than the second material. In one embodiment, the first material comprises martensitic steel, while the second material comprises a dual-phase, multiphase, complex-phase or TRIP steel. In addition, the first material may have a different thickness than the second material. The bumper beam provides an improved strength to weight ratio than conventional bumper beams. This abstract is provided to comply with the rules requiring an abstract that allows a searcher or other reader to quickly ascertain the subject matter of the disclosure. It is submitted with the understanding that it will not be used to interpret or limit the scope of the claims. 37 CFR 1.72(b).

15 Claims, 3 Drawing Sheets

MULTIPLE MATERIAL BUMPER BEAM

BACKGROUND OF THE INVENTION

1. Field of the Invention

The present invention relates to a bumper assembly for a motor vehicle, and more particularly to a bumper beam having multiple material properties.

2. Description of the Related Art

Automotive designers are continually trying to balance the need for lightweight, fuel efficient automobiles with safety standards and regulations imposed by the government and insurance companies. One such automotive component subject to heavy regulation is bumper assemblies with regard to crash safety standards. The bumper assembly is traditionally comprised of a bumper beam made of a metallic material with the requisite strength to conform to governmental standards for low and high speed crashes. Often, the strong metallic beam is heavy and adds significant weight to the vehicle thereby reducing fuel efficiency. There is a need in the automotive industry to develop a bumper assembly having a bumper beam with an increased strength to weight ratio by lowering the overall weight of the bumper assembly. The improved bumper assembly must still be strong enough to provide excellent performance in high speed and low speed crashes.

Furthermore, automotive manufacturers desire components that are affordable and easy to produce in a mass production operation. Traditional bumper assemblies are roll-formed whereby a flat steel strip extends through a series of rollers to shape the steel into a desired form. Complex bumper beam designs, while providing the necessary strength to conform to safety standards, add to the time and cost of the manufacturing process. There is a need in the automotive industry to produce a bumper beam that provides strength adequate to conform to safety standards, lightweight to improve fuel efficiency and simple to manufacture.

SUMMARY OF THE INVENTION

The inventors of the present invention have recognized these and other problems associated with the traditional bumper beams described above. To this end, the inventors have developed a bumper beam that weighs less while maintaining high quality standards related to impact or crash testing.

Specifically, the invention comprises a bumper beam having a first portion comprising a first material, and a second portion comprising a second material. The first material has different material properties than the second material.

DESCRIPTION OF THE PREFERRED EMBODIMENT

Figure 1:
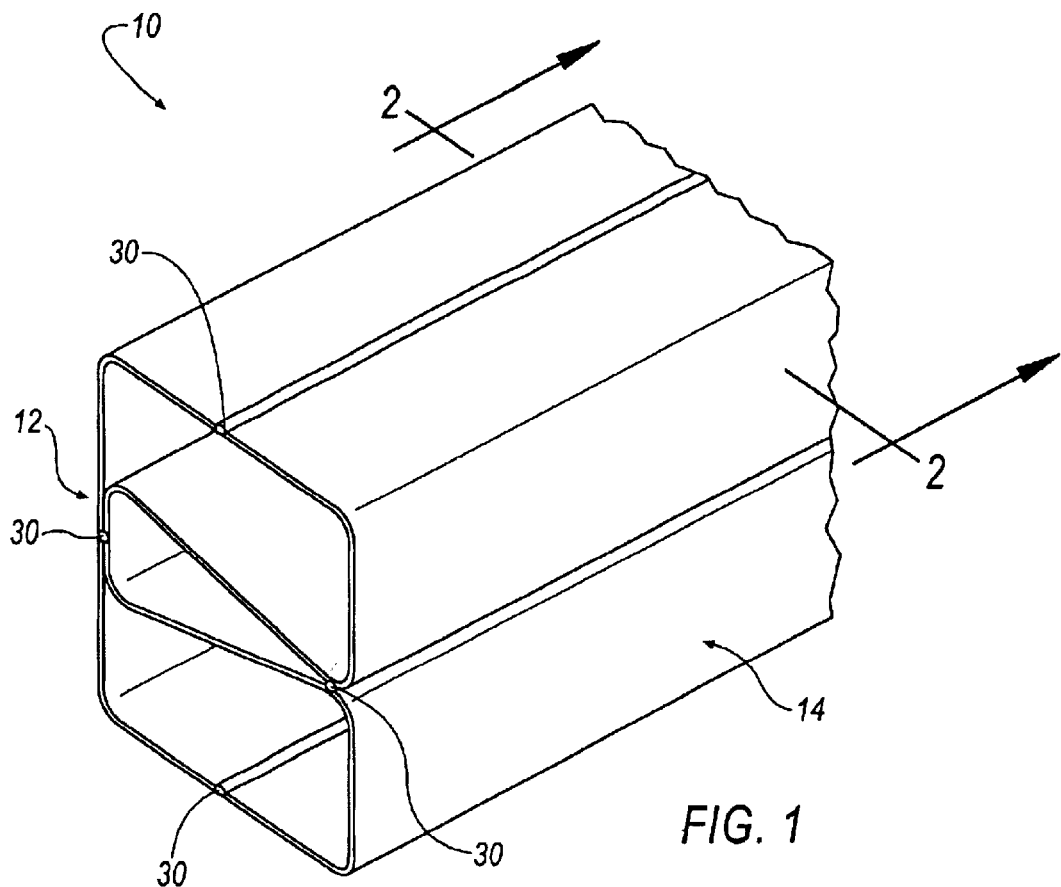
FIG. 1 is a perspective view of a bumper beam of the present invention.
Figure 3:
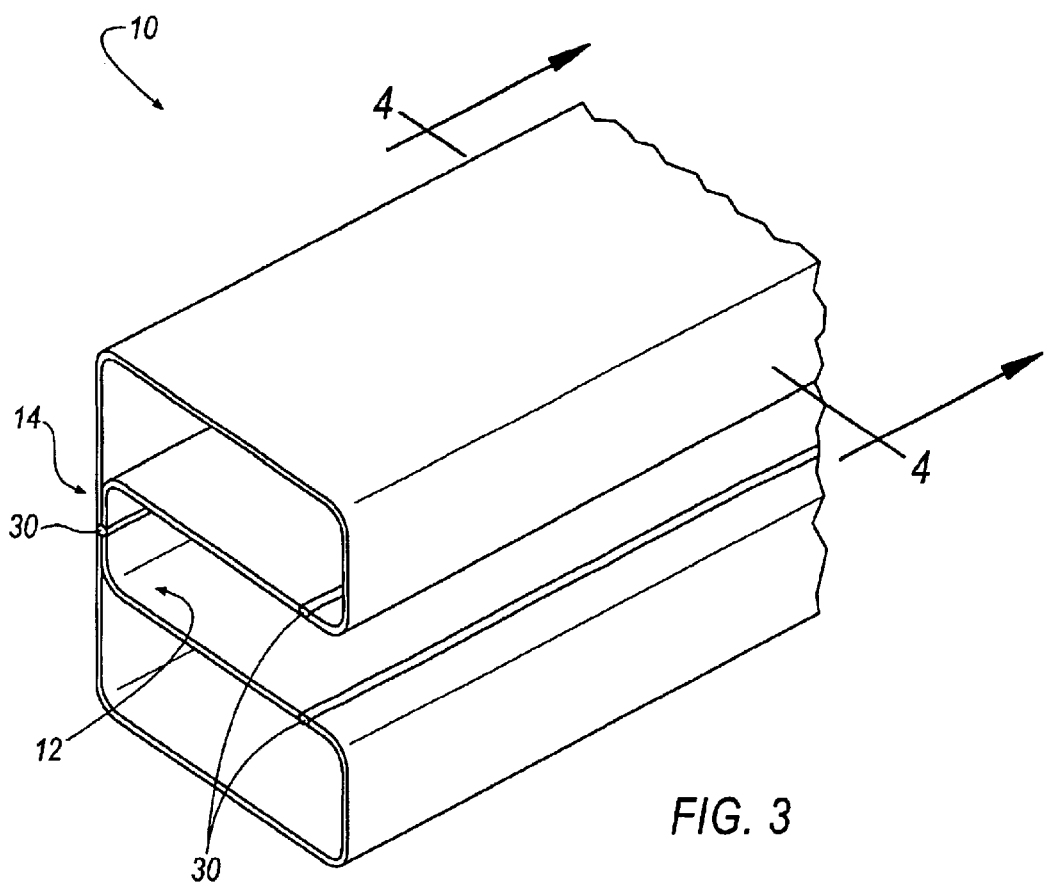
FIG. 3 is a perspective view of a second embodiment of a bumper beam of the present invention.

Referring to FIGS. 1 and 3, a bumper beam, generally referred at 10, is shown according to an embodiment of the invention. The bumper beam 10 is an elongated beam having a first portion 12 and a second portion 14. In one embodiment, the second portion 14 is fixedly attached to a vehicle (not shown) by traditional techniques, such as fasteners, bracket assemblies, or the like. The first portion 12 extends outwardly from the vehicle and is usually first to contact an external object (not shown) during a crash. The positions of the first portion 12 and second portion 14 are merely illustrative. Alternatively, the second portion 14 may be attached to the vehicle while the first portion 12 extends outwardly from the vehicle.

One aspect of the invention is that the first portion 12 and the second portion 14 are made from different materials, such as a first material and a second material, respectively. By way of example, the first portion 12 is made from the first material that is generally higher strength (tensile strength or yield strength) than the second material of the second portion 14. It has been found that forming the first portion 12 with the first material having a greater strength enables the bumper beam 10 to greater withstand the forces generated on the bumper beam 10 during a crash, as compared to a bumper beam made of a single material having a lesser strength than the first material. The second portion 14 is made from the second material having a lesser strength (tensile strength or yield strength) than the first material, but weighing less or the same as the first material. It has been found that the combination of the higher strength first material and the lighter or equal weight second material provides a bumper beam 10 with an increased or higher strength to weight ratio, as compared with traditional bumper assemblies made of a single material. The increased strength to weight ratio provides a bumper beam that conforms to governmental standards regarding high and low speed crashes, while also improving fuel efficiency of the vehicle. As a further example, the second material of the second portion 14 may be of generally higher strength (tensile strength or yield strength) than the first material of the first portion 12 while the first material weighs less than or equal to the second material. Any combination of materials having different material properties that results in an increased or higher strength to weight ratio of the bumper beam is contemplated by the present invention.

Figure 5:
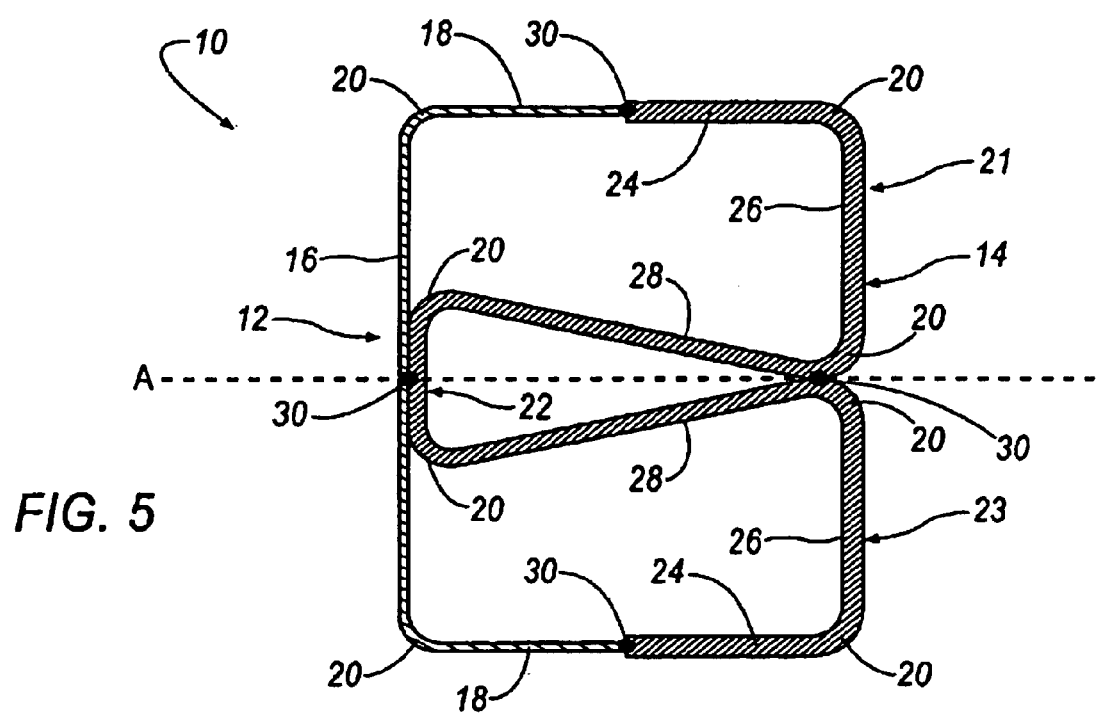
FIG. 5 is a cross-sectional view of an alternate embodiment of the bumper beam of FIG. 2 in which the first portion has a different thickness than the second portion.

In addition, the first material can be of a different gauge than the second material. For example, the first material of the first portion 12 can have a lesser thickness than the second material of the second portion 14 because the first material comprises a higher strength material than the second material, as shown in FIG. 5. In contrast, if the second material has a higher strength than the first material, then the second material may have a lesser thickness than the first material.

In an illustrated embodiment of the invention, the first portion 12 comprises martensitic steel. It has been found that martensitic steel provides very high structural strengths, for example, up to 1500 MPa ultimate tensile strengths, while still having remarkable formability. However, it will be appreciated that the invention is not limited by the specific material for the first material of the first portion 12, and that the invention can be practiced with other suitable materials that provide the strength needed for bumper assemblies.

Figure 2:
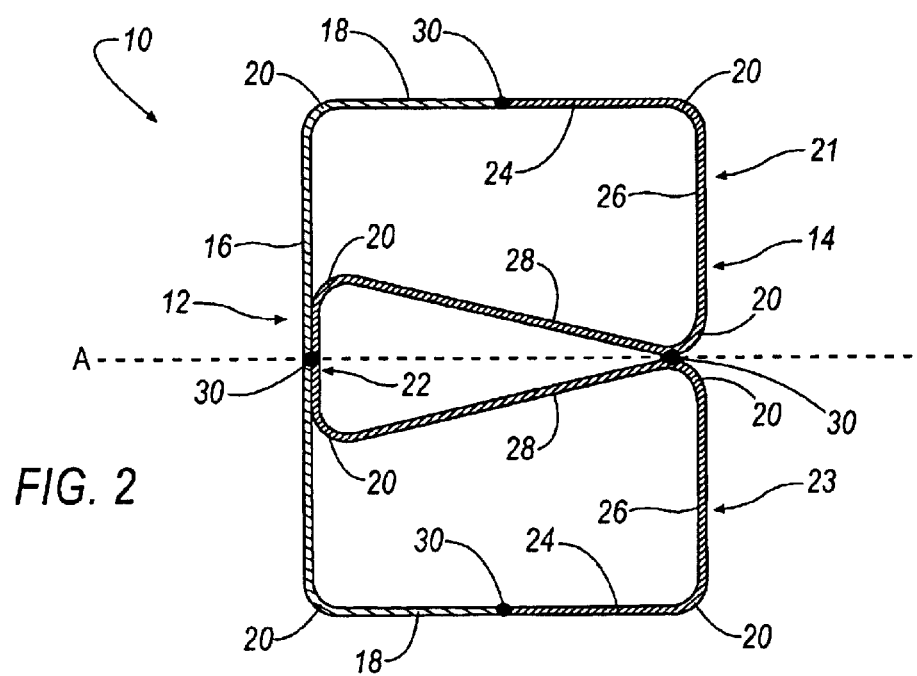
FIG. 2 is a cross-sectional view of a first embodiment of the bumper beam of the present invention taken along the line 2—2 of FIG. 1.

Referring to FIG. 2, a cross-sectional view of a first embodiment of the bumper beam 10 is shown. As seen in FIG. 2, the first portion 12 is generally C-shaped in cross-section and includes a back 16 and two legs 18. The legs 18 extend generally orthogonally from the back 16 at one or more bending portions 20.

Figure 4:
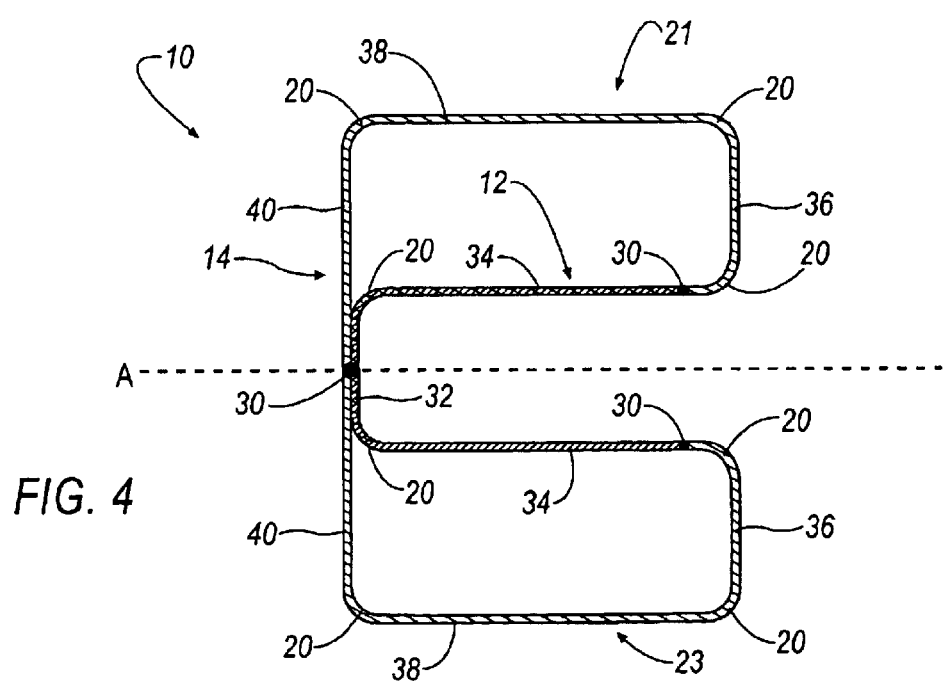
FIG. 4 is a cross-sectional view of the second embodiment of the bumper beam of the present invention taken along the line 4—4 of FIG. 3.

Referring to FIG. 4, a cross-sectional view of a second embodiment of the bumper beam 10 is shown. As seen in FIG. 4, the first portion 12 is generally C-shaped in cross-section and includes a back 32 and two legs 34. The legs 34 extend generally orthongonally from the back 32 at one or more of the bending portions 20.

In the illustrated embodiments of the invention, the second portion 14 comprises a dual-phase, multiphase, complex-phase or transformation induced plastic (TRIP) steel. One such material determined suitable for the second portion 14 of the bumper beam 10 is currently marketed under the trade name DI-Form 140T. DI-Form 140T is commercially available from Ispat Inland Inc. of East Chicago, Ind. (www.ispat.com). DI-Form 140T has an ultimate tensile strength of approximately 965 MPa. Although the second material of the second portion 14 is generally of a lower strength than the first material of the first portion 12, the second material of the second portion 14 weighs less than or equal to the first material of the first portion 12. It will be appreciated that the invention is not limited by the specific material used for the second portion 14, and that any material suitable for providing the necessary strength of the bumper assembly, while reducing the weight of the assembly, is acceptable for the second material of the second portion 14.

Referring to the first embodiment in FIG. 2, the second portion 14 includes two generally C-shaped sections 21, 23 integrally joined together by a connecting segment 22. Similar to the C-shaped first portion 12, each C-shaped section 21, 23 of the second portion 14 includes a back 26 and two legs 24, 28. One of the legs 24 is generally orthogonal to the back 26, while the second leg 28 extends angularly from the back 26. In the illustrated embodiment, the second leg 28 extends at an acute angle with respect to the back 26. Each C-shaped section 21, 23 includes one or more bending portions 20.

Referring to the second embodiment in FIG. 4, the second portion 14 includes two generally C-shaped sections 21, 23 integrally joined to each other. Each C-shaped section of the second embodiment includes a back 38 and two legs 36, 40. Both legs 36, 40 extend generally orthogonally from the back 38 at one or more of the bending portions 20. The legs 40 of each C-shaped section are integral to form one extended segment between the backs 38 of each C-shaped section. The C-shaped sections are symmetrical about a longitudinal axis, A, whereby the axis A, is midway between the backs 38.

The first portion 12 and the second portion 14 of both embodiments are fixedly attached to each other at one or more locations, indicated at 30, such as by welding, or the like. In the first illustrated embodiment, the first portion 12 and the second portion 14 are welded to each other at each of the legs 18 of the first portion 12 and each of the legs 24 of the second portion 14. Further, the connecting segment 22 is welded to the back 16 of the first portion 12 at a location 30 along the longitudinal axis, A, of the bumper beam 10. Finally, the bending portions 20 formed between the back 26 and the legs 28 are welded to each other along the longitudinal axis, A, of the bumper beam 10. As can be seen in FIG. 2, the bumper beam 10 is generally mirror symmetric with respect to the longitudinal axis, A. As a result, the location 30 at which the back 16 is welded to the connecting section 22 and the location 30 at which the bending portions 20 formed between the back 26 and the legs 28 are welded lie along a midpoint between the legs 18 of the first portion 12.

In the second embodiment the first portion 12 and second portion 14 are welded to each other at each of the legs 34 of the first portion 12 and the bending portions at each of the legs 36 of the second portion. Further, the back 32 of the first portion 12 is welded to the legs 40 of the second portion 14 along the axis, A, of the bumper beam 10.

It will be appreciated that the locations 30 of the welds to join the first portion 12 and the second portion 14 are only illustrative, and the weld locations 30 may be positioned anywhere suitable for fixedly attaching the first portion 12 and the second portion 14. Furthermore, other techniques known in the art for attaching the second portion 14 and the first portion 12 are also within the scope of the invention.

The cross-sectional configurations of the bumper beam 10 shown in the accompanying figures are only two examples of a bumper assembly that provides an increased strength to weight ratio as compared to conventional bumper assembly designs. Any cross-sectional configuration that incorporates two different materials is also contemplated by this invention. The configuration of the bumper beam 10, as shown, positions the higher strength material only where necessary to absorb forces during a crash. Utilizing the higher strength first material only where necessary allows the remainder of the bumper beam 10 to be manufactured of a lower strength, lighter second material.

Furthermore, the overall shape of the bumper beam 10, as shown in the figures, helps to provide additional stiffness to the beam. For example, the cross-sectional configuration of the first portion 12 being generally C-shaped along with the cross-sectional configuration of the second portion 14 with two C-shaped sections provides additional stiffness and helps the bumper beam 10 withstand forces during a crash. One benefit of the cross-sectional configuration of the invention is that the invention may eliminate the need for an energy absorber commonly found in traditional bumper assemblies.

Finally, the bumper beam 10 of the present invention is also simple to manufacture. As with traditional bumper assemblies, the bumper beam 10 is roll-formed. The first portion 12 and the second portion 14 are welded together and then roll-formed. Once formed, the first portion 12 and second portion 14 are then welded together within the assembly line at additional locations. The two-material design of the bumper assembly 10 of the invention provides the opportunity for in-line welding of the first portion 12 and the second portion 14 to form the bumper beam 10 and reduces extra material handling that may result from using two different materials.

While the invention has been specifically described in connection with certain specific embodiments thereof, it is to be understood that this is by way of illustration and not of limitation, and the scope of the appended claims should be construed as broadly as the prior art will permit.

What is claimed is:

1. A bumper beam, comprising:
    a first portion comprising a first material having a first end and a second end; and
    a second portion comprising a second material having a first end abutting said first end of said first portion and a second end abutting said second end of said first portion with a butt joint,
    wherein said first material has different material properties than said second material.

2. A bumper beam according to claim 1, wherein said first material has a generally higher strength than said second material.

3. A bumper beam according to claim 1, wherein said first material has a different thickness than said second material.

4. A bumper beam according to claim 1, wherein said first material comprises martensitic steel.

5. A bumper beam according to claim 1, wherein said second material comprises dual-phase, multiphase, complex-phase or transformation induced plasticity steel.

6. A bumper beam according to claim 1, wherein said first and second ends of said first portion and said first and second ends of said second portion are fixedly attached to each other.

7. A bumper beam according to claim 1, wherein said first portion has a generally C-shaped cross-section having a back and two legs extending orthogonally therefrom.

8. A bumper beam according to claim 7, wherein said second portion includes two generally C-shaped sections, each C-shaped section having two legs and a back positioned between said two legs.

9. A bumper beam according to claim 8, wherein said second portion further includes a connecting segment positioned between said two generally C-shaped sections.

10. A bumper beam according to claim 8, wherein at least one of said two legs of one of said two generally C-shaped sections extends generally orthogonal with respect to said back.

11. A bumper beam according to claim 9, wherein said connecting segment is fixedly attached to said back of said first portion.

12. A bumper beam, comprising:
   a first portion;
   having a generally C-shaped cross-section and comprising a first material, said first portion including a back and two legs extending orthogonally therefrom; and
   a second portion comprising a second material, said second portion includes two generally C-shaped sections, each C-shaped section having two legs and a back positioned between said two legs, wherein said second portion further includes a connecting segment positioned between said two generally C-shaped sections,
   wherein said first portion is attached to said second portion at a butt joint, and
   wherein said first material of said first portion has a different material property than said second material of said second portion.

13. A bumper beam according to claim 12, wherein one leg of said first portion includes a first end and the other leg of said first portion includes a second end, and wherein said one of said legs of said second portion includes a first end abutting said first end of said first portion, and wherein another one of said legs of said second portion includes a second end abutting said second end of said first portion.

14. A bumper beam, comprising:
   a first portion having a generally C-shaped cross-section and comprising a first material, said first portion including a back and two legs extending orthogonally therefrom; and
   a second portion comprising a second material, said second portion includes two generally C-shaped sections integrally joined to each other, each C-shaped section having two legs and a back positioned between said two legs, wherein one of said two legs of one of the two generally C-shaped sections is integral with one of said two legs of the other one of the two generally C-shaped sections to form one extended segment between each C-shaped section,
   wherein said first portion is attached to said second portion at a butt joint, and
   wherein said first material of said first portion has a different material property than said second material of said second portion.

15. A bumper beam according to claim 14, wherein one leg of said first portion includes a first end and the other leg of said first portion includes a second end, and wherein said one of said legs of said second portion includes a first end abutting said first end of said first portion, and wherein another one of said legs of said second portion includes a second end abutting said second end of said first portion.

* * * * *